J. PARTAIN.
WINDMILL.
APPLICATION FILED OCT. 2, 1912.

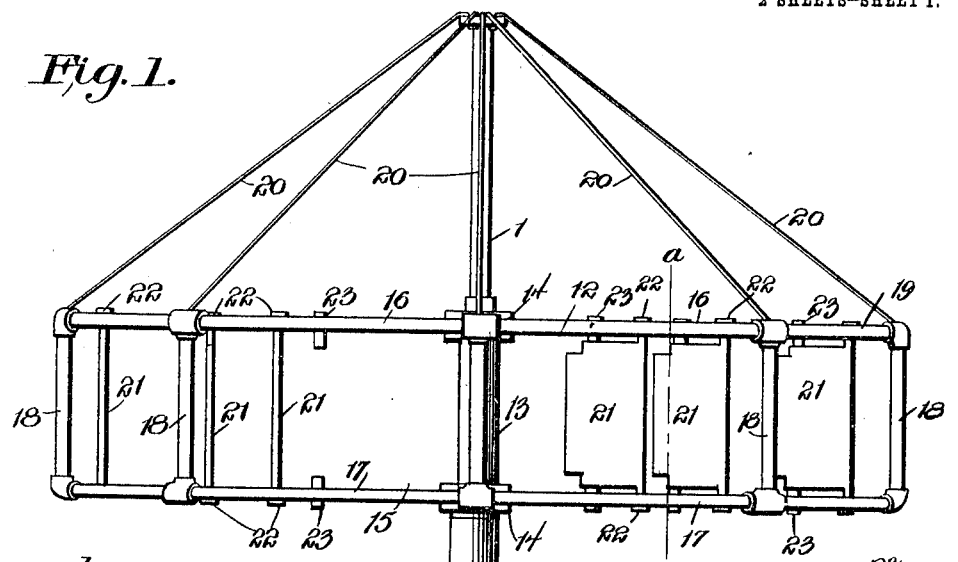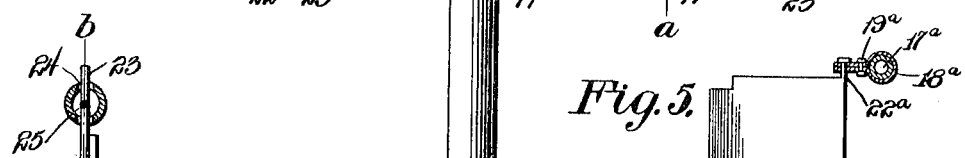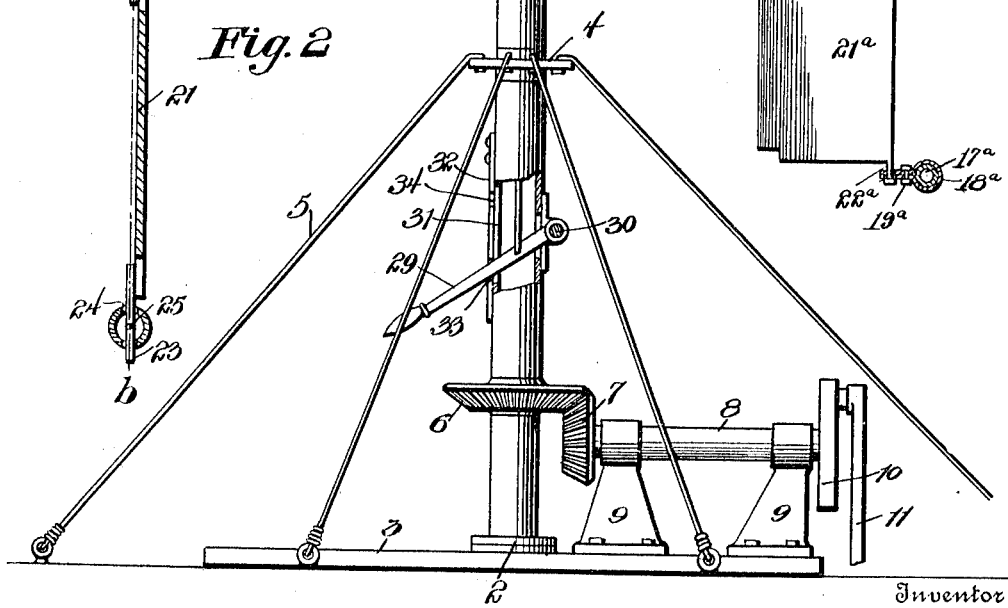

1,074,011.

Patented Sept. 23, 1913.
2 SHEETS—SHEET 2.

Witnesses
Wm. H. Mulligan.

Inventor
Joseph Partain.
By Victor J. Evans.
Attorney

UNITED STATES PATENT OFFICE.

JOSEPH PARTAIN, OF WILLIAMS, CALIFORNIA.

WINDMILL.

1,074,011.  Specification of Letters Patent.  Patented Sept. 23, 1913.

Application filed October 2, 1912.  Serial No. 723,545.

*To all whom it may concern:*

Be it known that I, JOSEPH PARTAIN, a citizen of the United States, residing at Williams, in the county of Colusa and State of California, have invented new and useful Improvements in Windmills, of which the following is a specification.

This invention is an improved wind mill for operating a pump or for driving other machinery and consists in the construction, combination and arrangement of devices hereinafter described and claimed.

The object of my invention is to provide an improved wind mill of greater size and power, in which the wind wheel is horizontal and the vanes thereof are always presented in direct pressure to the wind, irrespective of the direction of the wind and which, hence, requires no directing vane to keep it before the wind.

Another object of the invention is to make practical the construction and operation of larger wind mills, having a greater number of vanes in direct pressure to the wind, and hence, capable of producing greater power than is possible with wind mills as now constructed.

Another object is to effect improvements in the construction of the wind mill by means of which the vanes thereof may be readily and instantaneously thrown in or out of gear so as to control the operation of the wind mill, as desired.

Figure 3:
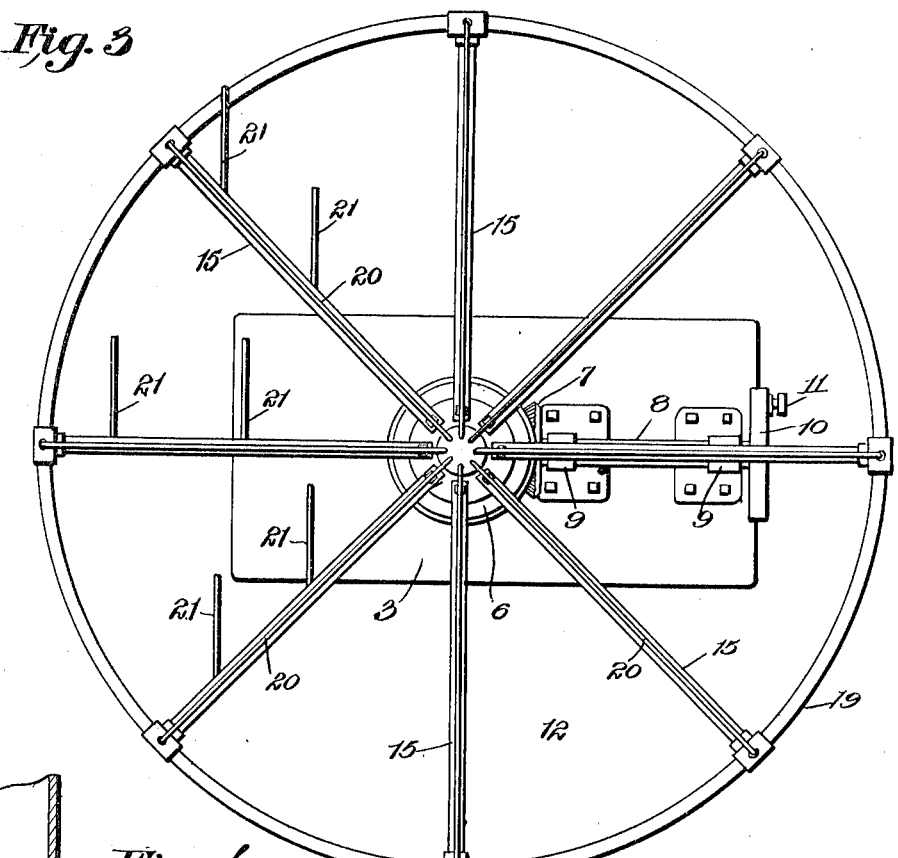
Figure 4:
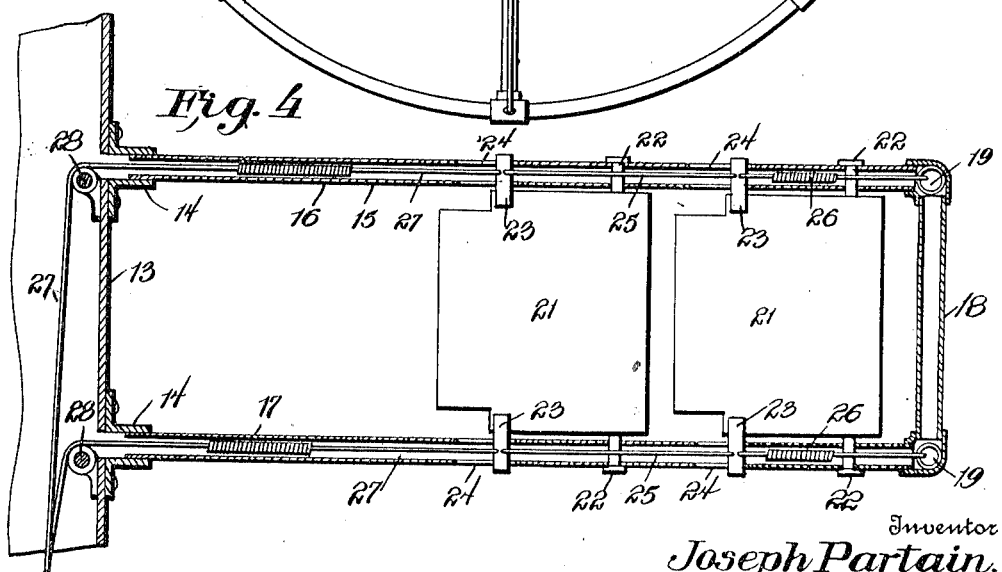

In the accompanying drawings:—Figure 1 is a side elevation of a wind mill constructed in accordance with my invention. Fig. 2 is a detail vertical transverse sectional view on the plane indicated by the line *a—a* of Fig. 1. Fig. 3 is a plan of my improved wind mill. Fig. 4 is a detail sectional view of the same on the plane indicated by the line *b—b* of Fig. 2. Fig. 5 is a detail sectional view, showing the means for pivotally mounting one of the vanes.

In accordance with my invention, I provide a tubular vertical shaft 1 which has a bearing 2 at its lower end on a supporting platform or frame 3 which may be of any suitable construction and the said vertical shaft also has a bearing 4 just below the arms of the wind wheel proper, guys 5 being attached to the said bearing, the said bearing 4 being here shown as a collar provided with a flange to which the guys are attached, the said collar bearing at its lower end on an annular flange 6 with which the said shaft is provided. Any suitable means may be employed for supporting the vertical shaft for rotation, within the scope of my invention. This vertical shaft is preferably provided near its lower end with a bevel gear 6 which engages a similar gear 7 on a horizontal shaft 8. The shaft 8 is mounted in bearings on a pair of standards 9 which rise from the platform or frame 3 and to the outer end of the said shaft 8 is attached a crank wheel 10 which serves to operate pump rod 11. Any suitable power transmission means may be employed in connection with my improved wind mill.

The wind mill 12 has a tubular hub 13 which is fitted on and secured to the shaft 1 and is provided with two or more flanges 14 suitably spaced apart. The radial arms 15 of the wind wheel are secured to the hub flanges 14 and each radial arm comprises an upper member 16 and one or more lower members 17, said members being preferably tubular and being, in practice, made of pipes of iron or steel and of suitable length and diameter. The outer ends of the members of each radial arm are connected by a vertical pipe 18 and the outer ends of said radial arms are also connected together by means of circular tire rods 19 which brace the said arms. Brace rods 20 are also employed which have their upper ends secured to the upper end of the tubular shaft 1 and their lower ends secured to the outer ends of the radial arm 16, the said brace rods 20 being radially arranged, as shown.

Each radial arm of the inner wheel carries a suitable number of vertical vanes 21 each vane being provided at a point spaced from its outer side and to one side and out of its center with vertical pivots 22 which pass through vertical openings in a metal cuff or band which is bolted around and projects out from the tubular upper and lower members of the arms so that the said vanes are pivotally connected to the said arms and are adapted to be locked in radial relation, parallel with the radial arms and are also adapted to swing in one direction so as to automatically feather, so that while the vanes on one side of the wind wheel are presented broad-side to the action of the wind, those on the other side of the wind wheel are presented edgewise to the action of the wind.

Dogs 23 are provided and engage one side of the vanes so as to lock the vanes in parallel relation to the radial arms on one side of the wind wheel and permit them to feather on the opposite end thereof. These dogs pass vertically through the tubular upper and lower members of the wind wheel arms and operate in longitudinal slots 24 with which the said tubular members are provided. The dogs of each tubular member are connected together for simultaneous movement as by means of rods or other suitable devices 25 and springs 26 are also connected to the dogs which, when the wind mill is in operation, move the dogs outwardly or toward the outer ends of the arms of the wind wheel and keep them in the paths of pivotal movement of the vanes so that the dogs hold the vanes on one side of the wind mill broad-side to the action of the wind. Cords 27 are connected to the dogs and lead inwardly to and downwardly in the tubular shaft 1, engage suitable direction pulleys 28 and have their lower ends connected to a lever 29 which lever is carried by the tubular shaft and has its fulcrum as at 30 at one side thereof. The said lever is free to move in a vertical slot 31 with which the tubular shaft is provided and the said tubular shaft is also provided with a spring catch 32 which has a pair of spaced recesses 33—34. When the lever is depressed it engages the recess 33 and is locked, thereby in such position and acts upon the cords 27 to hold the dogs 23 out of the paths of the vanes so that all of the vanes of the wind wheels are free to swing in any direction on their pivots and, hence, all of the vanes present their edges to the action of the wind and the wind wheel ceases to revolve. In order to start the wind mill in operation, the lever is raised and engaged with the recess 34, thereby slackening the cords 27 and enabling the springs 26 to move the dogs outwardly into the paths of the vanes.

While I have herein shown and described a preferred form of my invention, I would have it understood that changes may be made in the form, proportion and construction of the several parts without departing from the spirit of my invention and within the scope of the appended claims.

I claim:—

1. A wind mill of the class described having a vertical tubular shaft mounted for revolution, a horizontally arranged wind wheel carried by the shaft and for revolution therewith, the said wind wheel being provided with tubular radial upper and lower arms having longitudinal slots, vertically arranged vanes carried by the said radial arms and pivotally connected thereto, the pivotal axes of the vanes being to one side of the vertical centers thereof, dogs mounted for movement in the slots of the tubular arms into and out of the paths of the vanes, springs arranged in the tubular arms and connected to the dogs to normally move the latter into the paths of the vanes, a lever mounted in the revoluble tubular shaft and flexible connections between the dogs and the lever, the said flexible connections being arranged in the tubular arms and tubular shaft.

2. A wind mill of the class described comprising a tubular vertical shaft mounted for rotation, upper and lower tubular radial arms having their inner ends connected to said shaft, vertical pipes connecting the upper and lower tubular arms, circular tire rods connecting the outer ends of said tubular radial arms, vertical vanes pivotally mounted and carried by said upper and lower tubular radial arms, dogs guided by said tubular radial arms and movable into and out of engagement with the said vanes, springs arranged in the tubular radial arms and connected to the dogs to normally hold the dogs in the paths of the vanes, and means arranged in the tubular shaft and tubular radial arms and connected to the dogs to move the latter out of engagement with the vanes and against the tension of the said springs.

In testimony whereof I affix my signature in presence of two witnesses.

JOSEPH PARTAIN.

Witnesses:
W. R. TARNER,
ALBERT FOUCH.

---

Copies of this patent may be obtained for five cents each, by addressing the "Commissioner of Patents, Washington, D. C."